United States Patent
Prinet et al.

(10) Patent No.: US 10,108,866 B2
(45) Date of Patent: Oct. 23, 2018

(54) METHOD AND SYSTEM FOR ROBUST CURB AND BUMP DETECTION FROM FRONT OR REAR MONOCULAR CAMERAS

(71) Applicants: GM GLOBAL TECHNOLOGIES, LLC, Detroit, MI (US); CARNEGIE MELLON UNIVERSITY, Pittsburgh, PA (US)

(72) Inventors: Veronique C. Prinet, Paris (FR); Jinsong Wang, Troy, MI (US); Lee Jongho, Pittsburgh, PA (US); David Wettergreen, Wexford, PA (US)

(73) Assignees: GM Global Technology Operations LLC, Detroit, MI (US); Carnegie Mellon University, Pittsburgh, PA (US)

( * ) Notice: Subject to any disclaimer, the term of this patent is extended or adjusted under 35 U.S.C. 154(b) by 246 days.

(21) Appl. No.: 15/165,070

(22) Filed: May 26, 2016

(65) Prior Publication Data
US 2017/0344836 A1 Nov. 30, 2017

(51) Int. Cl.
*G06K 9/00* (2006.01)
*G06K 9/62* (2006.01)
*G06K 9/46* (2006.01)

(52) U.S. Cl.
CPC ....... *G06K 9/00805* (2013.01); *G06K 9/4604* (2013.01); *G06K 9/6269* (2013.01); *G06K 9/4642* (2013.01)

(58) Field of Classification Search
CPC . G06K 9/00805; G06K 9/4604; G06K 9/6269
See application file for complete search history.

(56) References Cited

U.S. PATENT DOCUMENTS

| | | | | |
|---|---|---|---|---|
| 8,099,213 B2* | 1/2012 | Zhang | ............... | G01S 7/4802 340/437 |
| 8,537,338 B1* | 9/2013 | Medasani | ............ | G01C 21/32 356/4.01 |
| 9,285,230 B1* | 3/2016 | Silver | ................ | G01C 21/26 |
| 2010/0097457 A1* | 4/2010 | Zhang | ............ | G06K 9/00798 348/119 |
| 2010/0204866 A1* | 8/2010 | Moshchuk | ......... | B62D 15/027 701/25 |

(Continued)

OTHER PUBLICATIONS

Masmoudi, Imen, et al. "Vision based system for vacant parking lot detection: Vpld." Computer Vision Theory and Applications (VISAPP), 2014 International Conference on. vol. 2. IEEE, 2014.*

*Primary Examiner* — Jonathan S Lee
(74) *Attorney, Agent, or Firm* — Quinn IP Law (57) ABSTRACT

A method of detecting a curb. An image of a path of travel is captured by a monocular image capture device mounted to a vehicle. A feature extraction technique is applied by a processor to the captured image. A classifier is applied to the extracted features to identify a candidate region in the image. Curb edges are localized by the processor in the candidate region of the image by extracting edge points. Candidate curbs are identified as a function of the extracted edge points. A pair of parallel curves is selected representing the candidate curb. A range from image capture device to the candidate curb is determined. A height of the candidate curb is determined. A vehicle application is enabled to assist a driver in maneuvering a vehicle utilizing the determined range and depth of the candidate curb.

21 Claims, 5 Drawing Sheets

(56) References Cited

U.S. PATENT DOCUMENTS

| | | | | |
|---|---|---|---|---|
| 2013/0058528 A1* | 3/2013 | Liu | ................... | G06K 9/00805 |
| | | | | 382/103 |
| 2013/0266175 A1* | 10/2013 | Zhang | ................ | G06K 9/00798 |
| | | | | 382/103 |
| 2015/0332114 A1* | 11/2015 | Springer | .............. | G06K 9/4604 |
| | | | | 348/148 |
| 2016/0147915 A1* | 5/2016 | Pope | ................... | G06F 17/5004 |
| | | | | 703/1 |

* cited by examiner

METHOD AND SYSTEM FOR ROBUST CURB AND BUMP DETECTION FROM FRONT OR REAR MONOCULAR CAMERAS

BACKGROUND OF INVENTION

An embodiment relates to augmented curb and bump detection.

Advanced Driving Assistance Systems (ADAS) is often viewed as an intermediate stage before reaching full autonomous driving. ADAS functionality integrates various active safety features. A goal is to alert the driver of possible danger and prevent a collision whether it is a pedestrian, another vehicle, or object (e.g., pedestrian/vehicle detection, lane departure warning, and lane keeping assist). Many advanced systems of the vehicle (e.g., automatic cruise control, lane change demand, parking assist) take partial control of the vehicle such as autonomously modifying the speed and/or steering while taking into account the surrounding environment.

Curb detection contributes to accurate vehicle positioning in urban areas. The detection of curbs in front/rear of the vehicle is crucial for applications such as parking assist/autonomous parking. The accurate localization and range estimation of the curb is passed to the vehicle control system, which in turn smoothly maneuvers the vehicle so as to avoid possible shock with the front/rear curb or to avoid curbs around a curvature in the road.

The challenge in extracting curbs and bump from images lies in their small size (e.g., approximately 10-20 cm high). While the curbs three dimensional (3D) shape is pretty standard, it would be possible to model the curb as a two dimensional (2D) step-function. Consequently, most current approaches rely on active sensor (Lidar) or stereo-camera, which make it possible to directly extract 3D information which assists in simplifying the processing. Such techniques often use various road marks (e.g., soft shoulder, curbs, and guardrails, based on strong prior knowledge about road scenes).

While some systems rely on various techniques such as deep learning, hierarchical probabilistic graphical model, integrate prior knowledge, or exploit multi-sensor fusion, none of these general frameworks deal explicitly with curb detection because of their small size and its non-distinctive pattern require a dedicated approach to be successful.

SUMMARY OF INVENTION

An advantage of an embodiment is the use of a single monocular image capture device to capture and image for detecting curbs and other similar structures. The first stage is directed at detecting and localizing candidate curb regions in the image using a machine learning classifier combined with a robust image appearance descriptor and sliding window strategy. A Histogram of Gradient selected as an image descriptor. The sliding window classifier returns a score per window, indicating the region where the curb is most likely to appear in the image. Parallel edge lines are extracted localize curb borders with a candidate region. The result is a pair of curves that delineate the curb in the image. The second stage computes the geometry of the candidate curb. Given a few assumptions about the scene and the camera such as the road surface being flat, a camera-to-curb or camera-to-bump distance can be estimated from the image. For curb detection, it is further assumed that the curb is substantially orthogonal to the ground plane, and curb's height can be estimated. Lastly, temporal information is applied to filter out false detection. Candidate curb lines detected in the current frame will appear in the next frame at a position determined by the only camera motion. A simple task can then be applied to define a Kalman filter (or any other tracking method) to track the pair of lines over time and potentially to remove pair of lines which are inconsistent over time.

An embodiment contemplates a method of detecting a curb. An image of a path of travel is captured by a monocular image capture device mounted to a vehicle. A feature extraction technique is applied by a processor to the captured image. A classifier is applied to the extracted features to identify a candidate region in the image. Curb edges are localized by the processor in the candidate region of the image by extracting edge points. Candidate curbs are identified as a function of the extracted edge points. A pair of parallel curves is selected representing the candidate curb. A range from image capture device to the candidate curb is determined. A height of the candidate curb is determined. A vehicle application is enabled to assist a driver in maneuvering a vehicle utilizing the determined range and depth of the candidate curb.

DETAILED DESCRIPTION

The following detailed description is meant to be illustrative in understanding the subject matter of the embodiments and is not intended to limit the embodiments of the subject matter or the application and the uses of such embodiments. Any use of the word "exemplary" is intended to be interpreted as "serving as an example, instance, or illustration." Implementations set forth herein are exemplary and are not meant to be construed as preferred or advantageous over other implementations. The descriptions herein are not meant to be bound by any expressed or implied theory presented in the preceding background, detailed description or descriptions, brief summary or the following detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. It should be appreciated that the various block components shown in the figures may be realized by any number of hardware, software, and/or firmware components configured to perform the specified functions. For example, an embodiment of a system or a component may employ various integrated circuit components, (e.g., memory elements, digital signal processing elements, logic elements, look-up tables, or the like, which may carry out a variety of functions under the control of one or more microprocessors or other control devices).

When implemented in software, various elements of the systems described herein are essentially the code segments or computer-executable instructions that perform the various tasks. In certain embodiments, the program or code segments are stored in a tangible processor-readable medium, which may include any medium that can store or transfer information. Examples of a non-transitory and processor-readable medium include an electronic circuit, a microcontroller, an application-specific integrated circuit (ASIC), a semiconductor memory device, a ROM, a flash memory, an erasable ROM (EROM), a floppy diskette, a CD-ROM, an optical disk, a hard disk, or the like.

The system and methodology described herein can be utilized to identify curbs and other like structures for driver awareness assist systems, semi-autonomous driving systems, or autonomous driving systems. While the approach and methodology are described below with respect to vehicle applications, one of ordinary skill in the art appreciates that an automotive application is merely exemplary, and that the concepts disclosed herein may also be applied to any other suitable systems and boundary detections that include, but are not limited to, manufacturing facilities with autonomously driven vehicle or robots or general industrial applications.

The term "vehicle" as described herein can be construed broadly to include not only a passenger automobile, but any other vehicle including, but not limited to, wheelchairs, rail systems, planes, off-road sport vehicles, robotic vehicles, motorcycles, trucks, sports utility vehicles (SUVs), recreational vehicles (RVs), marine vessels, aircraft, farming vehicles, and construction vehicles.

Figure 1:
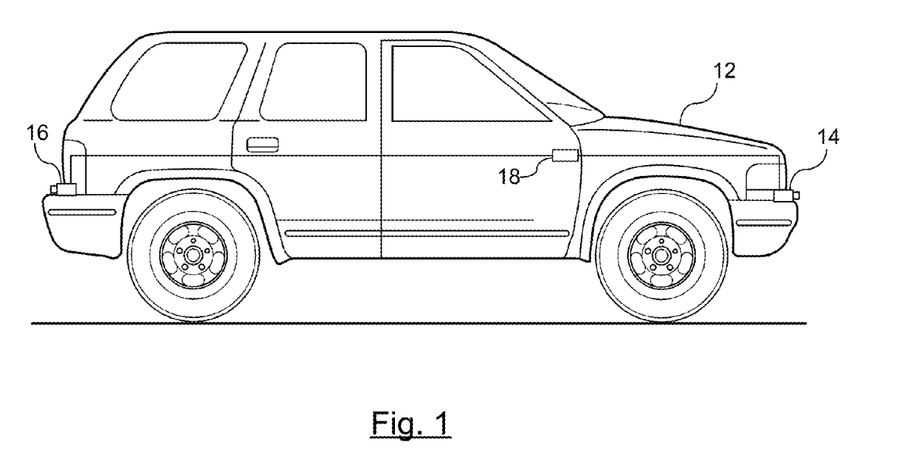
FIG. 1 is a vision-based curb detection system integrated on a vehicle.

There is shown in FIG. 1 a vehicle integrating a curb detection system for a vehicle 12. It should be understood while the embodiment described herein pertains to a vehicle traveling on the road, the invention is not limited to vehicles traveling along a road, but can include other boundary detections that include, but are not limited to, manufacturing facilities with autonomously driven vehicle or robots. The term curb as used herein is inclusive of other similar barriers such a bumps and other protrusions extending from the ground surface.

The curb detection system is equipped with at least one monocular image capture device mounted to the vehicle 12. A first monocular image capture device 14 may include an image capture device mounted to a front of the vehicle. A second monocular image capture device 16 may be mounted to a rear of the vehicle 12. The first image capture device 14 and the second image capture device 16 is in communication with a processing unit 18 for receiving processing images captured by the image capture devices for curb detection.

Figure 2:
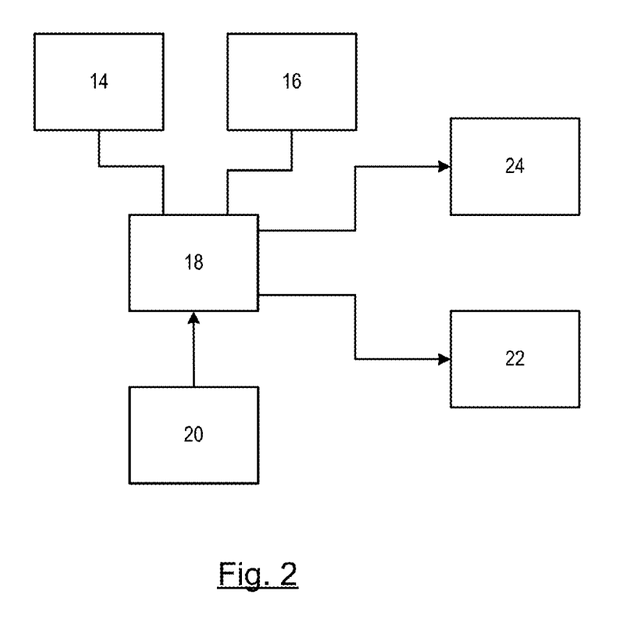
FIG. 2 illustrates a block diagram of the vision-based curb detection system.

FIG. 2 illustrates a block diagram of the vision based curb detection system. The first monocular image capture device 14 obtains data forward of the vehicle when the vehicle is driven in a forward direction and the second monocular image capture device 16 may capture images to the rear of the vehicle when the vehicle is backing up. The monocular image capture devices are single eye image capture devices. A fisheye lens may be used to capture a greater viewing angle or a traditional non-fisheye lens may be used. In addition, images may be obtained from a still image capture device or a video image capture device may be used where single frames are utilized from the captured video.

The processor 18 is coupled to the first monocular image capture device 14 and the second monocular image capture device 16. Alternatively, the processor 18 may be a shared processor of another device. The processor 18 identifies the curbs based on the techniques described herein. A memory 20 may be used to store data obtained by the monocular image capture devices. Moreover, the memory 20 may store other types of data that is used by the processor 18 during curb detection analysis.

The vision based curb detection system may include output devices 22 that include vehicle applications that include, but are not limited to, collision avoidance applications, clear path detection applications, object detection applications, and vehicle motion applications, autonomous vehicle navigation systems. The vision based curb detection system may further include display devices 24 for assisting the driver in enhancing such curbs displayed on the display device 24.

The respective technique utilizes a model that identifies a road curb using both visual cues and geometric characteristics of images obtained from the monocular camera. In addition, temporal information may be utilized by exploiting observation's redundancy between consecutive frames. The main underlying assumption of the model is that the road surface is flat and that the curb is approximately orthogonal to the road plane.

Figure 3:
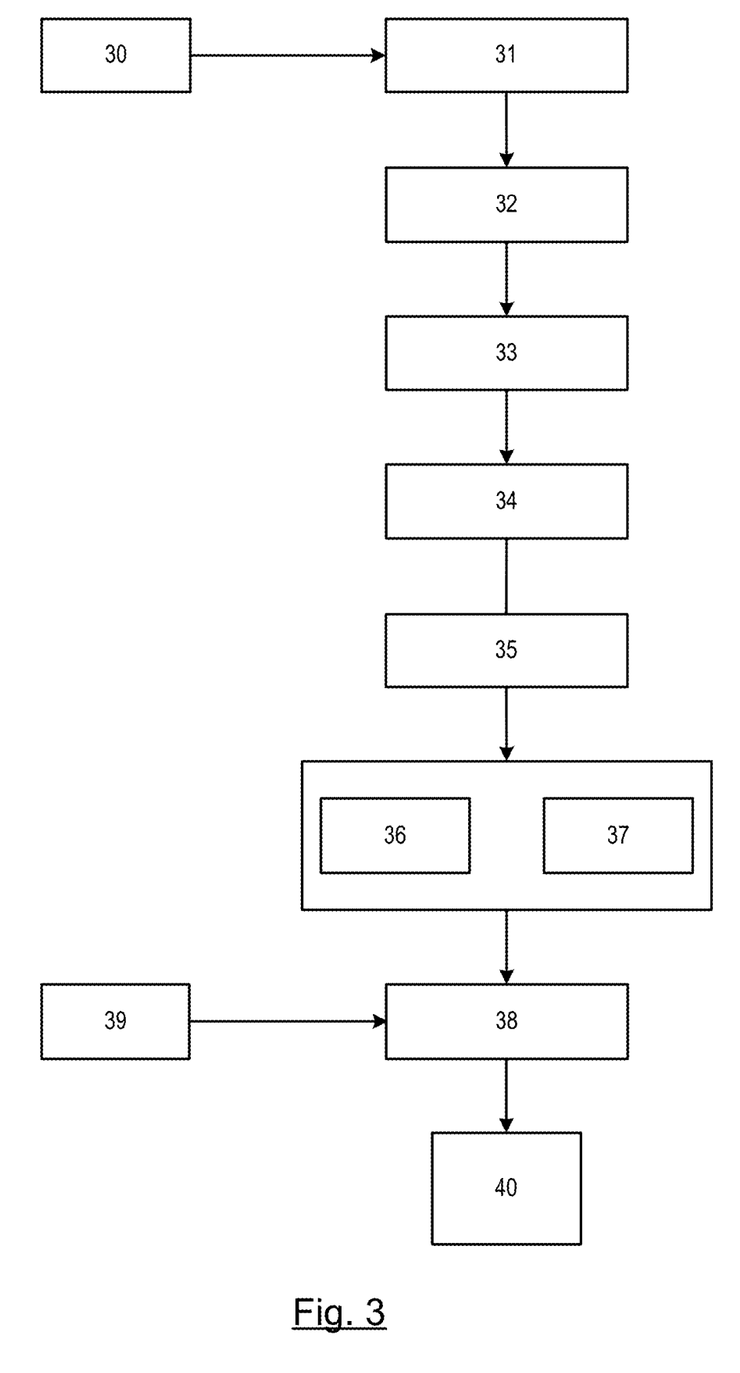
FIG. 3 a flowchart of a process for detecting curb-like structures.

FIG. 3 is a flowchart for a process of detecting curb-like structures.

In step 30, an image is captured at a first instance of time by one of the monocular image capture devices. The monocular image capture device is focused in a direction that the vehicle is traveling.

Figure 4:
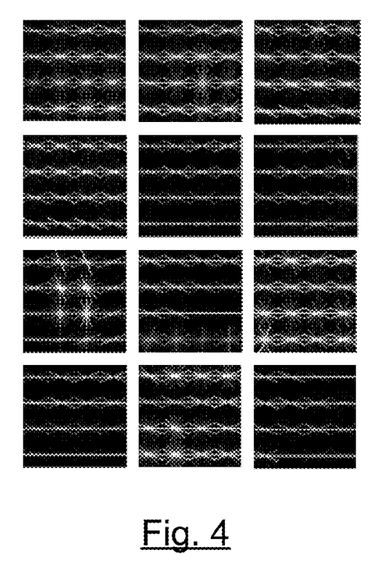
FIG. 4 illustrates examples of HOG features for curbs.
Figure 5:
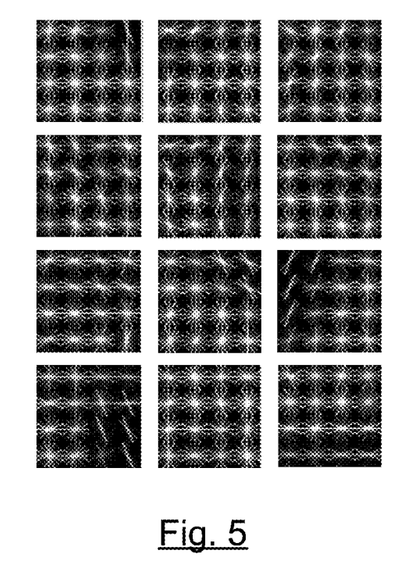
FIG. 5 illustrates examples of HOG features for non-curbs.

In step 31, the input image is input to a processor for processing. Feature extraction is performed to detect a curb in the image. An exemplary process includes a Histogram of Gradient (HOG) which is used as a feature descriptor to process the image for the purpose of object detection. The image is divided into small connected regions (e.g., patches), and for those pixels within each of the regions, a histogram of gradient directions is compiled. An advantage of utilizing HOG is that the descriptor operates on local patches and is invariant to photometric transformations. HOG is extracted at two scales using a two-level pyramid representation of each image. Examples of curbs and non-curb patches of HOG features are depicted in FIG. 4 and FIG. 5, respectively. As an alternative to multi-scale strategy, an adaptive-size window may be utilized. It should be understood that HOG is only one example of a feature descriptor and that other feature descriptor techniques may be used.

Figure 6:
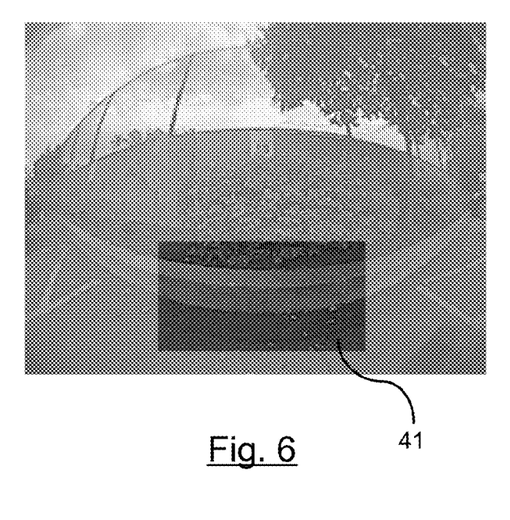
FIG. 6 is an exemplary image of a detected candidate region.

In step 32, the extracted descriptor is input to a classifier including, but not limited to, a binary linear support vector machine (SVM), to classify each patch. The SVM model is learned from a set of positive and negative patches samples (i.e., patch including or not including curbs), extracted from a training dataset. At testing stage, the SVM is applied and curb candidate patches are detected. Overlapping candidate patches accumulate votes for a curb/non-curb category. A single connected candidate region in each frame is then extracted by applying a threshold on the voting score of each patch. FIG. 6 illustrates a detected candidate region 41.

Figure 7:
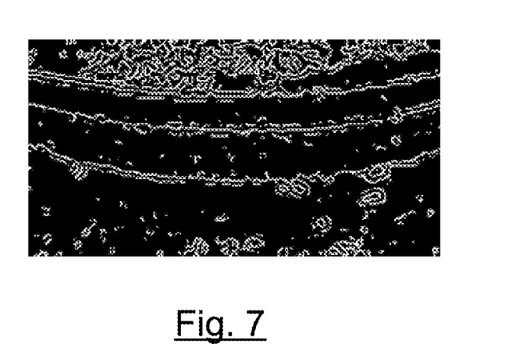
FIG. 7 is an exemplary image of extracted edge points.

Once candidate regions are determined, localization of curb edges is determined. Borders of the curb (e.g., the top and bottom discontinuities of the 2D step function) enable to the routine to delineate the exact area of the curb. To localize these borders, in step 33, standard edge points/lines algorithm is applied within the candidate region, after the image is smoothed with a Gaussian filter. An example of extracting edge points is shown in FIG. 7.

Figure 8:
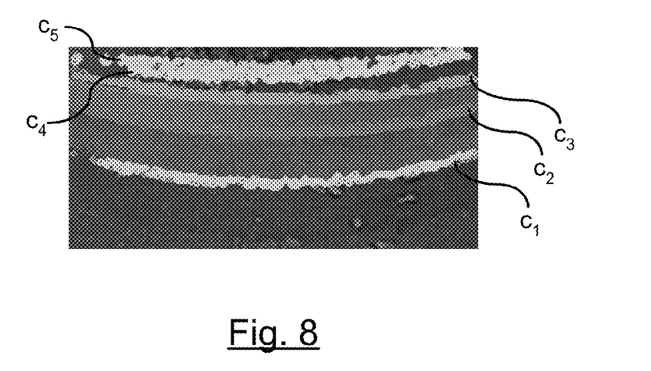
FIG. 8 is an exemplary image identified candidate curves.

In step 34, based on the strong edge points, up to five curves $c_1$, $c_2$, $c_3$, $c_4$, $c_5$ (i.e., second order polynomials) are fit using a sequential Ransac algorithm as shown in FIG. 8.

Figure 9:
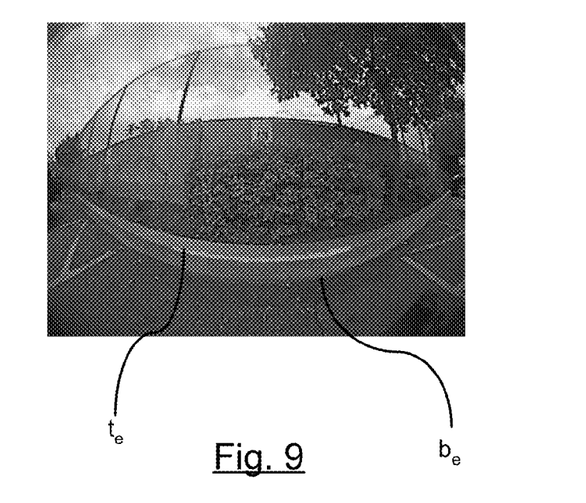
FIG. 9 is an exemplary image of a selected pair of edges representing a top edge and a bottom edge.

In step 35, parallel curves that have a distant spacing (e.g., 10-25 cm) within a predetermined range are retained. Among the possible extracted curves, a most probable pair is selected based on a simple heuristic, and each of the curves of the pair are labeled either a bottom edge or top edge, so as to form couples of points $\{(p_i^b, p_i^t)\}_{i=1...N}$. An example is shown in FIG. 9 of the identified top edge $t_e$ and bottom edge $b_e$.

Figure 10:
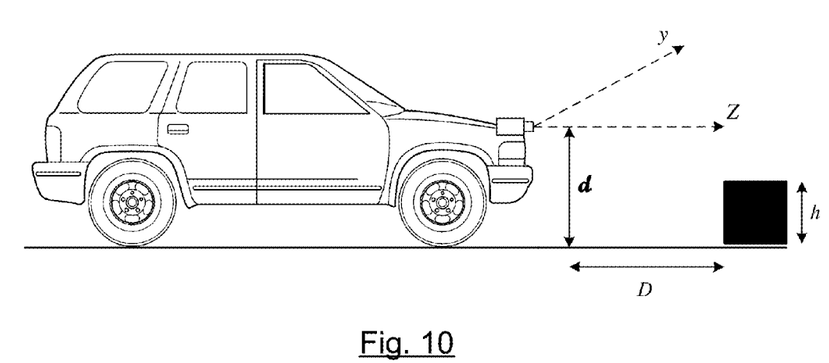
FIG. 10 is an exemplary image illustrating a depth and a height to a candidate curb.

As the parallel curbs are retained that represent an upper and lower boundary of the curb, the geometry of the curb is determined. FIG. 10 illustrates an exemplary image illustrating a depth D and a height h to a candidate curb. Geometric analysis enables the depth and elementary 3D information to be estimated. A few assumptions are made within regards to the respective scene as shown in FIG. 10. They are as follows: i) camera intrinsic parameters are known, ii) a planar ground road is present, iii) a camera height with respect to the ground plane is known. FIG. 10 illustrates a specific case where the camera optical axis is parallel to the ground plane and the curb plane orthogonal to the ground plane. It should be understood that the present embodiment is not restricted to those particular cases and can be easily generalized to settings where the optical axis is not parallel to ground plane and curb plane not strictly orthogonal to the road.

In step 36, a range from the vehicle to the curb is estimated. It should be understood that the following description hereinafter regarding the height detection applies to curbs, not bumps as different assumptions are made for bumps. If the camera is equipped with fisheye lens, and given the camera intrinsic parameters estimated from camera calibration, a point on the distorted image p=(u,v) is mapped onto its unit-norm bearing vector b=(û,v̇,ẇ), where û, v̇ and ẇ are the coordinates of the bearing vector along X,Y,Z camera reference axis as depicted in FIG. 10. The bearing vector defines the optical ray associated with point p. Thus, given a point Pg on the road ground plane in the 3D real world projects in $p^g$ in the image. Assuming an camera optical axis parallel to the road plane, the camera-to-curb distance $D^g$ can be expressed as follows:

$$D^g = h \frac{\dot{w}^g}{\dot{u}^g} \quad \text{eq (1)}$$

where $\dot{w}^g$ is the coordinate along axis Z of the bearing vector in the camera-center reference system and h is the camera height. Eq. 1 can be generalized for more general cases (non parallelism between camera axis and road plane).

If the camera is equipped with a rectilinear lens, the camera-to-curb distance can be expressed as:

$$D^g = h \frac{f}{\dot{u}^g} \quad \text{eq (2)}$$

where f is the camera focal length provided by camera intrinsic parameter calibration.

In step 37, if the curb plane is assumed to be orthogonal to the road surface, points of curb's bottom-border detected in the image, $\{p_i^b\}$ are also located on the ground plane in the scene, the distance $D_i^b$ is first computed from these points. Using assumption v) ($D_i = D_i^b = D_i^t$), a height of the curb ($\Delta h$) for each pair of points ($p_i^b, p_i^t$) can be determined using the following equation, in the case of fisheye model:

$$\Delta h_i = D_i \frac{\dot{u}^g}{\dot{w}^g} - h \quad \text{eq (3)}$$

where $D_i$ is the estimated depth from eq 1, $\dot{w}_i^t$ and $\dot{u}_i^t$ are the coordinates of the bearing vector of $p_i^t$ and h is the camera height. Similarly, in rectilinear model, the expression becomes:

$$\Delta h_i = D_i \frac{u_i^t}{f} - h. \quad \text{eq (4)}$$

In step 38, temporal filtering is applied as a post-processing step to eliminate possible false-positives or to recover false negatives due to possible erroneous detection or localization. An image captured at a next time frame, in step 39, is input to the temporal filter. A tracking filter including, but not limited to, a Kalman filter, may be applied to the edge points to adjust/correct a detection of false positives such as intermittent failure.

In step 40, detected frames are provided to an output device. Annotated frames indicating a presence of a curbs and attributes may be displayed on a display device to the driver. In addition, vehicle applications such as autonomous parking or lane centering may utilize the information to autonomously guide the vehicle in relation to the detected curb.

While certain embodiments of the present invention have been described in detail, those familiar with the art to which this invention relates will recognize various alternative designs and embodiments for practicing the invention as defined by the following claims.

What is claimed is:

1. A method of detecting a curb comprising:
capturing an image of a path of travel by an image capture device mounted to a vehicle, wherein an optical axis of the image capture device is parallel to a plane of a surface having the curb, and the image capture device has an XYZ camera-center reference system;
applying a feature extraction technique by a processor to the captured image to generate extracted features of the captured image;
applying a classifier to the extracted features to identify a candidate region in the image;
localizing curb edges by the processor in the candidate region of the captured image by extracting edge points;
identifying at least one candidate curb as a function of the extracted edge points;
selecting a pair of parallel curves representing the candidate curb;
determining a range from the image capture device to the candidate curb via the processor;
and enabling a vehicle application to assist a driver in maneuvering a vehicle utilizing the determined range to the candidate curb;

wherein determining the range includes using the following formula:

$$D^g = h\frac{\dot{w}^g}{\dot{u}^g}$$

where $D^g$ is the range, $\dot{w}^g$ and $\dot{u}^g$ are the coordinates along respective axes Z and X, in the XYZ camera-center reference system, of a bearing vector $b=(\dot{u},\dot{v},\dot{w})$ of a point on the image, and h is a height of the image capture device above a road surface having the candidate curb.

2. The method of claim 1 wherein applying a feature extraction technique to the captured image includes applying a descriptor for dividing the captured image into cells.

3. The method of claim 2 wherein applying the descriptor includes applying a Histogram of Gradient for dividing the captured image into cells, and wherein a histogram of gradient directions is compiled for each cell as a function of the pixels in each cell.

4. The method of claim 3 wherein the cells have patches defined as small connected regions, and wherein applying a classifier to the extracted features includes applying a binary classifier to classify each of the patches of each cell to identify candidate regions.

5. The method of claim 3 wherein the cells have patches defined as small connected regions, and applying a classifier to the extracted features includes applying a support vector machine to classify each of the patches of each cell to identify candidate regions.

6. The method of claim 1 wherein localized curb edges in the candidate regions includes extracting edge points from the candidate regions.

7. The method of claim 6 wherein a Gaussian filter is applied to smooth the image prior to extracting the edge points.

8. The method of claim 1 wherein identifying candidate curb includes identifying a plurality of candidate curbs that are spaced within a predetermined range of one another.

9. The method of claim 8 wherein the plurality of candidate curbs include five curb lines.

10. The method of claim 8 wherein second order polynomials are used to fit curb lines in the candidate regions.

11. The method of claim 1 wherein the selected pair of parallel curves represent an upper boundary and a lower boundary of the candidate curb.

12. The method of claim 1 wherein determining a range from the image capture device to the candidate curb includes determining a range from a camera plane of the image capture device to the candidate curb.

13. The method of claim 1 further comprising applying temporal smoothing via the processor as a post-processing step to eliminate false positives.

14. The method of claim 13 wherein applying temporal smoothing includes capturing a next image at a next time frame, via the image capture device, and applying a tracking filter to the processed image and the next image via the processor, wherein the temporal smoothing observes redundancies between consecutive image frames.

15. The method of claim 1 wherein enabling a vehicle application includes displaying the image on a display device to the driver and highlighting the identified curb in the display device.

16. The method of claim 1 wherein enabling a vehicle application includes applying the range the candidate curb to an autonomous parking application, the autonomous parking application actuating vehicle devices to park the vehicle.

17. The method of claim 1 wherein enabling a vehicle application includes applying the range to the candidate curb to a collision avoidance application, the collision avoidance application actuating vehicle devices to avoid a collision with the curb.

18. The method of claim 1 wherein enabling a vehicle application includes applying the range to the candidate curb to a clear path detection system, the clear path detection system actuating vehicle devices to maintain the vehicle along the path of travel.

19. The method of claim 1 wherein enabling a vehicle application includes applying the range to the candidate curb to a lane centering application, the lane centering application actuating vehicle devices to center the vehicle within the lane.

20. A method of detecting a curb from a vehicle using an image capture device mounted to the vehicle and having an XYZ camera-center reference system, the method comprising:

capturing an image of a path of travel via the image capture device;

applying a feature extraction technique to the captured image using a processor to thereby generate extracted features of the image;

applying a classifier to the extracted features to identify a candidate region in the image;

localizing curb edges in the identified candidate region of the image by extracting edge points via the processor;

identifying a candidate curb in the identified candidate region as a function of the extracted edge points;

selecting a pair of parallel curves representing the candidate curb;

determining a range from the image capture device to the candidate curb via the processor; and enabling a vehicle application to assist a driver in maneuvering a vehicle utilizing the determined range of the candidate curb;

wherein determining the range includes using the following formula:

$$D^g = f\frac{f}{\dot{u}^g}$$

where $D^g$ is the determined range, $\dot{u}^g$ is the coordinate along axis X within the XYZ camera-center reference system of a bearing vector $b=(\dot{u},\dot{v},\dot{w})$ of a point on the image, h is a height of the camera above a road surface having the candidate curb, and f is the camera focal length provided by camera intrinsic parameter calibration.

21. The method of claim 1, further comprising estimating a height ($\Delta h_i$) of the candidate curb using the following equation:

$$\Delta h_i = D_i\frac{\dot{u}^g}{\dot{w}^g} - h;$$

where $D_i$ is the determined range ($D^g$); and enabling the vehicle application using the estimated height of the candidate curb.

* * * * *